US011847334B2

(12) United States Patent
Goyal et al.

(10) Patent No.: US 11,847,334 B2
(45) Date of Patent: Dec. 19, 2023

(54) METHOD OR APPARATUS TO INTEGRATE PHYSICAL FILE VERIFICATION AND GARBAGE COLLECTION (GC) BY TRACKING SPECIAL SEGMENTS

(71) Applicant: EMC IP Holding Company LLC, Hopkinton, MA (US)

(72) Inventors: Rahul Goyal, Indore (IN); Tony Wong, Milpitas, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 228 days.

(21) Appl. No.: 17/482,601

(22) Filed: Sep. 23, 2021

(65) Prior Publication Data
US 2023/0089018 A1    Mar. 23, 2023

(51) Int. Cl.
*G06F 3/06* (2006.01)
*G06F 12/02* (2006.01)

(52) U.S. Cl.
CPC ............ *G06F 3/0641* (2013.01); *G06F 3/067* (2013.01); *G06F 3/0622* (2013.01); *G06F 3/0652* (2013.01); *G06F 3/0659* (2013.01); *G06F 12/0253* (2013.01)

(58) Field of Classification Search
None
See application file for complete search history.

(56) References Cited

U.S. PATENT DOCUMENTS

| | | | | |
|---|---|---|---|---|
| 7,610,437 B2 * | 10/2009 | Sinclair | ................. | G06F 3/0652 711/104 |
| 7,984,084 B2 * | 7/2011 | Sinclair | ............... | G06F 16/1847 707/818 |
| 8,285,918 B2 * | 10/2012 | Maheshwari | ........ | G11C 7/1072 711/159 |
| 8,443,263 B2 * | 5/2013 | Selinger | ............. | G06F 11/1068 714/768 |
| 8,732,403 B1 * | 5/2014 | Nayak | ................... | G06F 3/0619 711/170 |
| 8,873,284 B2 * | 10/2014 | Sinclair | ............... | G06F 12/0246 365/185.11 |
| 9,223,693 B2 * | 12/2015 | Sinclair | ............... | G06F 12/0246 |
| 9,336,133 B2 * | 5/2016 | Sinclair | ............... | G06F 12/0246 |
| 9,348,746 B2 * | 5/2016 | Sinclair | ............... | G06F 12/0246 |
| 9,465,731 B2 * | 10/2016 | Sinclair | ............... | G06F 12/0246 |
| 9,715,434 B1 * | 7/2017 | Xu | .......................... | G06F 3/067 |

(Continued)

*Primary Examiner* — Christopher D Birkhimer
(74) *Attorney, Agent, or Firm* — WOMBLE BOND DICKINSON (US) LLP

(57) ABSTRACT

Methods and systems for managing data in a distributed system are disclosed. The distributed system may include devices used by users (e.g., clients) and devices in which data is stored for future accessibility (e.g., storage providers). A data storage system may manage the data for the clients. To manage the data efficiently, the data storage system may perform an integrated process of both verifying that segments of files believed to be stored are actually stored and segments of files that no longer need to be stored are removed. The process may not be performed in real-time as files that no longer need to be stored are identified (e.g., as deletion requests are received). Rather, the integrated process may employ a garbage collection process where deletion conditions for segments are checked intermittently over time, and files are verified.

20 Claims, 9 Drawing Sheets

(56) References Cited

U.S. PATENT DOCUMENTS

| | | | |
|---|---|---|---|
| 9,734,050 B2* | 8/2017 | Sinclair | G06F 12/0253 |
| 9,734,911 B2* | 8/2017 | Sinclair | G06F 3/0658 |
| 9,778,855 B2* | 10/2017 | Sinclair | G06F 3/064 |
| 10,108,543 B1* | 10/2018 | Duggal | G06F 11/14 |
| 10,108,544 B1* | 10/2018 | Duggal | G06F 11/14 |
| 10,120,613 B2* | 11/2018 | Sinclair | G06F 12/02 |
| 10,133,490 B2* | 11/2018 | Sinclair | G06F 3/0655 |
| 10,255,179 B2* | 4/2019 | Ji | G06F 3/0659 |
| 10,430,279 B1* | 10/2019 | Dittia | G06F 3/0656 |
| 10,628,298 B1* | 4/2020 | Chinthekindi | G06F 3/0641 |
| 10,664,165 B1* | 5/2020 | Faibish | G06F 3/0638 |
| 10,795,812 B1* | 10/2020 | Duggal | G06F 3/067 |
| 10,983,715 B2* | 4/2021 | Sharoni | G06Q 20/105 |
| 10,983,908 B1* | 4/2021 | Zou | G06F 12/0253 |
| 11,086,537 B2* | 8/2021 | Byun | G06F 3/0679 |
| 2007/0033325 A1* | 2/2007 | Sinclair | G06F 3/0608 |
| | | | 711/170 |
| 2008/0082596 A1* | 4/2008 | Gorobets | G06F 12/0253 |
| 2008/0144079 A1* | 6/2008 | Pandey | H03M 7/30 |
| | | | 358/1.15 |
| 2008/0189477 A1* | 8/2008 | Asano | G06F 12/0246 |
| | | | 711/E12.008 |
| 2010/0077013 A1* | 3/2010 | Clements | G06F 16/1748 |
| | | | 707/822 |
| 2010/0088296 A1* | 4/2010 | Periyagaram | G06F 16/183 |
| | | | 707/E17.014 |
| 2010/0125553 A1* | 5/2010 | Huang | G06F 11/1453 |
| | | | 707/661 |
| 2010/0174881 A1* | 7/2010 | Anglin | G06F 11/1453 |
| | | | 711/E12.103 |
| 2010/0281081 A1* | 11/2010 | Stager | G06F 9/5022 |
| | | | 707/814 |
| 2010/0333116 A1* | 12/2010 | Prahlad | G06F 3/0649 |
| | | | 713/153 |
| 2011/0145473 A1* | 6/2011 | Maheshwari | G06F 12/12 |
| | | | 711/E12.008 |
| 2011/0161784 A1* | 6/2011 | Selinger | G06F 11/1016 |
| | | | 714/E11.002 |
| 2014/0114932 A1* | 4/2014 | Mallaiah | G06F 3/0641 |
| | | | 707/E17.032 |
| 2014/0325148 A1* | 10/2014 | Choi | G06F 3/0659 |
| | | | 711/114 |
| 2014/0365719 A1* | 12/2014 | Kuzmin | G06F 12/0246 |
| | | | 711/103 |
| 2015/0205816 A1* | 7/2015 | Periyagaram | G06F 11/1453 |
| | | | 707/827 |
| 2015/0227602 A1* | 8/2015 | Ramu | G06F 11/1456 |
| | | | 707/634 |
| 2015/0261776 A1* | 9/2015 | Attarde | G06F 16/1748 |
| | | | 707/664 |
| 2016/0246713 A1* | 8/2016 | Choi | G06F 3/0608 |
| 2016/0350324 A1* | 12/2016 | Wang | G06F 16/137 |
| 2017/0038978 A1* | 2/2017 | Li | G06F 3/0611 |
| 2017/0123655 A1* | 5/2017 | Sinclair | G06F 3/061 |
| 2018/0189175 A1* | 7/2018 | Ji | G06F 3/0679 |
| 2018/0314727 A1* | 11/2018 | Epstein | G06N 5/01 |
| 2020/0019623 A1* | 1/2020 | Wong | G06F 16/137 |
| 2020/0089420 A1* | 3/2020 | Sharoni | G06Q 20/354 |
| 2020/0192794 A1* | 6/2020 | Lee | G06F 12/0246 |
| 2020/0310686 A1* | 10/2020 | Truong | G06F 3/061 |
| 2021/0271644 A1* | 9/2021 | Chinthekindi | G06F 12/0253 |
| 2021/0342362 A1* | 11/2021 | Haravu | G06F 11/1464 |
| 2021/0374021 A1* | 12/2021 | Santhakumar | G06F 3/0659 |

* cited by examiner

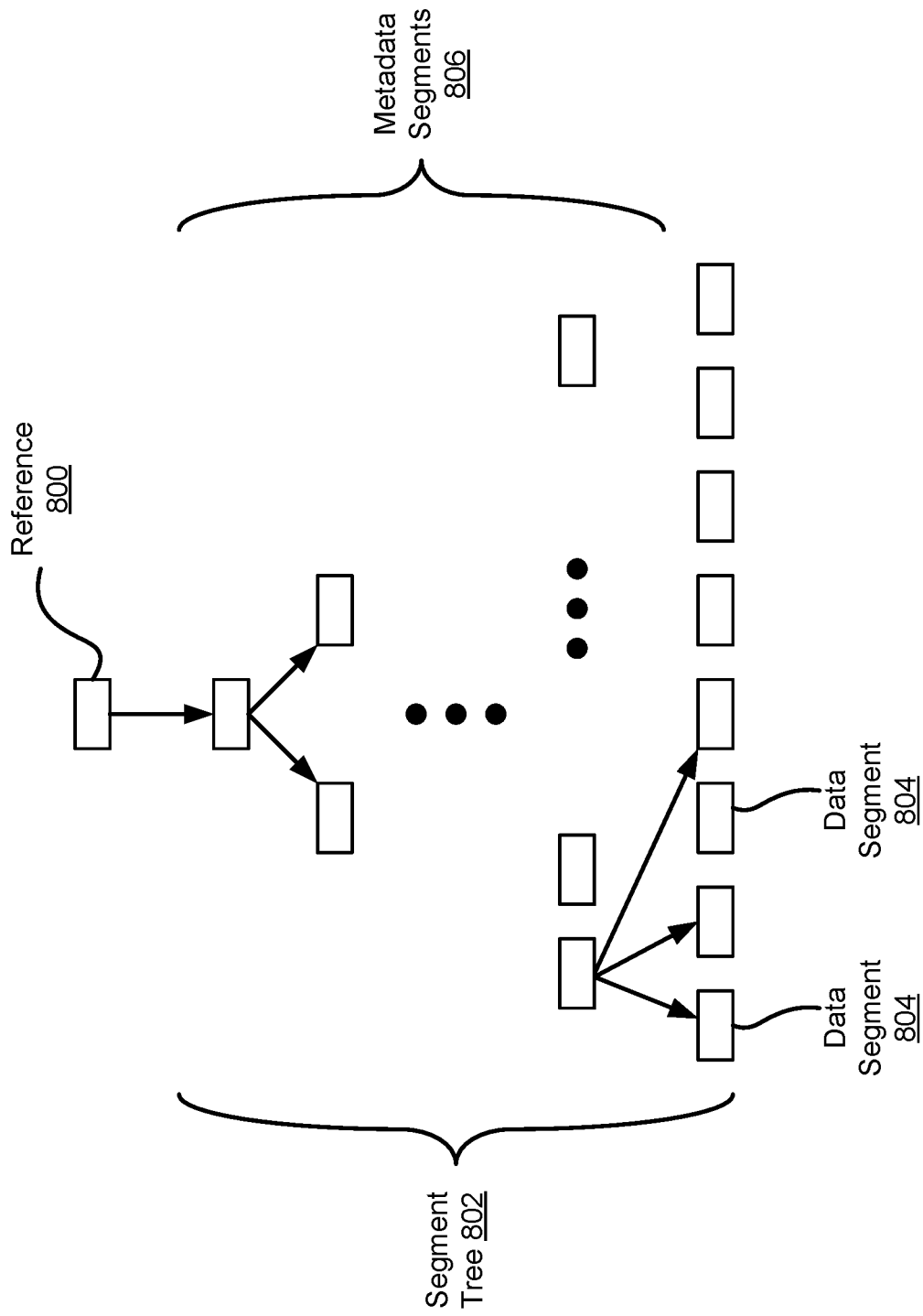

METHOD OR APPARATUS TO INTEGRATE PHYSICAL FILE VERIFICATION AND GARBAGE COLLECTION (GC) BY TRACKING SPECIAL SEGMENTS

FIELD OF THE INVENTION

Embodiments of the present invention relate generally to data storage systems. More particularly, embodiments of the invention relate to systems and methods to verify that data is stored and to remove data that is no longer needs to be stored.

BACKGROUND

Users of computing devices may rely on being able to access previously stored data. For example, the users may store contact information for colleagues, financial account information, travel plans, etc. in data structures stored in the computing devices. If the computing devices become inaccessible or the data structures becomes inaccessible for other reasons, the users of the computing devices may be unable to access their previously stored data.

BRIEF DESCRIPTION OF THE DRAWINGS

Embodiments of the invention are illustrated by way of example and not limitation in the figures of the accompanying drawings in which like references indicate similar elements.

FIG. 8 is a diagram illustrating a data structure in accordance with an embodiment.

DETAILED DESCRIPTION

Figure 1:
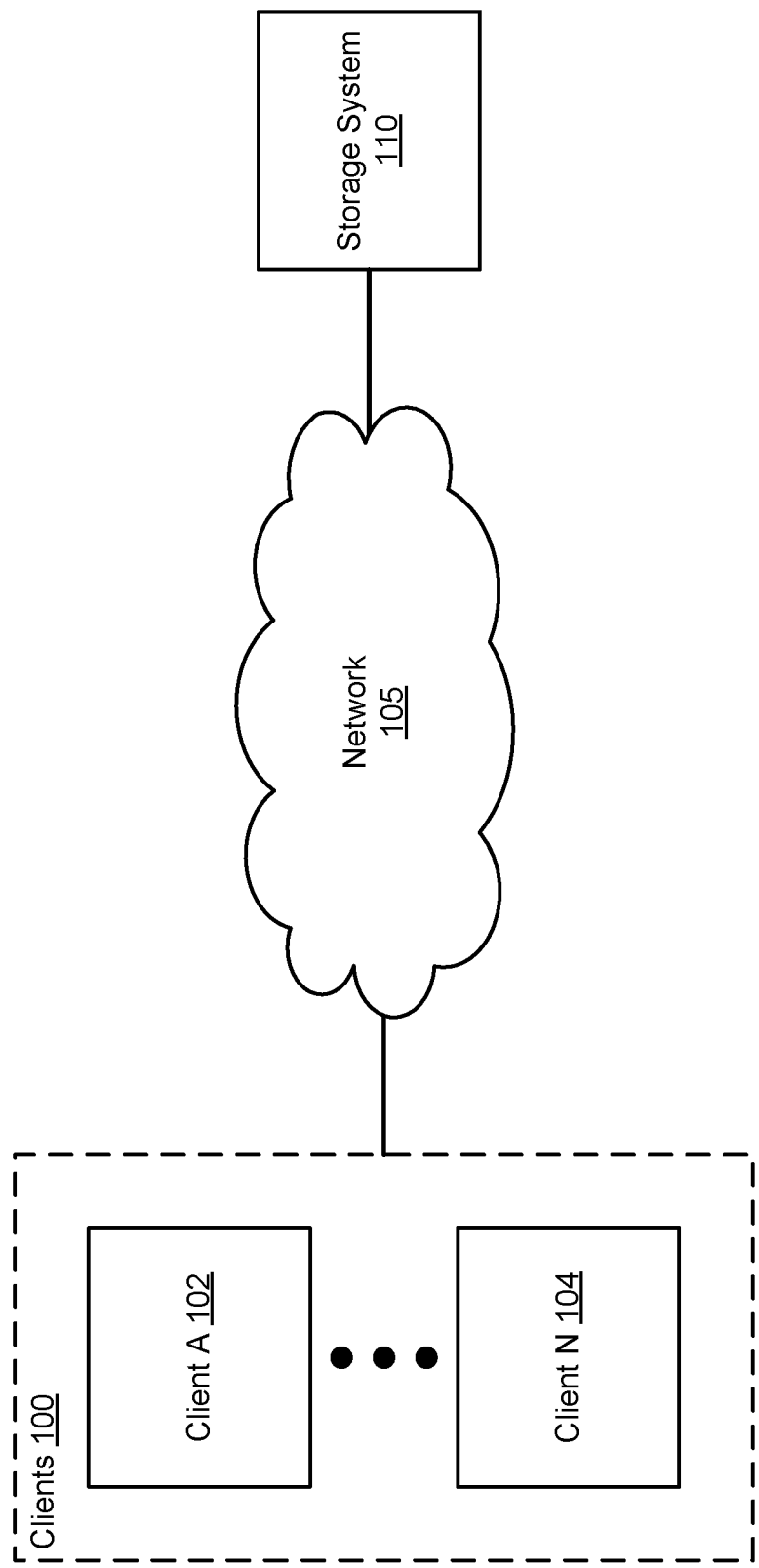
FIG. 1 is a block diagram illustrating a system in accordance with an embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In general, embodiments of the invention relate to methods and systems for managing data in a distributed system. The distributed system may include devices used by users (e.g., clients) and devices in which data is stored for future accessibility (e.g., storage providers). A data storage system may manage the data for the clients.

To manage the data efficiently, the data storage system may perform an integrated process of both verifying that segments of files believed to be stored are actually stored and segments of files that no longer need to be stored are removed. The process may not be performed in real-time as files that no longer need to be stored are identified (e.g., as deletion requests are received). Rather, the integrated process may employ a garbage collection process where deletion conditions for segments are checked intermittently over time.

In an embodiment, the data storage system stores data in a deduplicated state. Consequently, only a single copy of a segment (or reduced numbers of copies when compared to storing data without deduplication) of a file may be stored in the storage system even when multiple requests for storing the segment are served with the storage system.

The data storage system may also store the deduplicated data in a containerized format that includes a limited amount of metadata regarding the stored data. Consequently, it may not be computationally efficient to delete data, and, more specially may not be computationally efficient to ascertain whether any segment stored in a container may be deleted (e.g., by ascertain whether the segment is necessary to regenerate any previously stored files).

To provide for both garbage collection and file verification, certain segments (e.g., special segments) written to the storage may be tracked while the garbage collection and file verification process is performed. As will be discussed below, under some conditions, some segments may be treated as live regardless of status. When doing so, data structures used to perform file verification may indicate that segments have been lost even when segments have not actually been lost. To remove the impact of treating segments as live regardless of their status, the special fingerprints may be tracked and used to determine whether a segment has actually been lost or merely appears to be lost by virtue of treating the corresponding segment as live regardless of its actual status.

By implementing a system, as discussed above, an embodiment may provide for the computationally efficient verification and garbage collection of segments stored in a deduplicated, containerized storage system. By performing the computationally efficient process, the storage system may be better able to marshal its limited computing resources to perform its function of storing data and providing copies of stored data.

In an embodiment, a computer-implemented method for managing data in a deduplicated data storage system that stores deduplicated segments of files in containers by performing physical file verification and garbage collection while new segments of the files are ingested by the deduplicated data storage system is provided. The method includes populating a perfect hash vector (PHVEC) with fingerprints of segments believed to be stored in the deduplicated data storage system. The special segments may be segment references that written while garbage collection is being performed on a container (e.g., in a container range) and reference a segment in the container. The method may also include selecting a portion of the containers using the PHVEC for garbage collection; copying live data from the portion of the containers to other containers, tracking special segments written to an all-live range of containers, and deleting the portion of the containers while updating the populated PHVEC. The all-live range may include containers, outside of container range in which cleaning is being performed, and to that which segment references are being written that reference segments stored in the containers of the container range that is being cleaned. These special segments may be problematic because the fingerprints for the referenced segments may be outside of the container range being cleaned. Thereby, these special segments may cause collision with the PHVEC and may cause it to appear that corruption has occurred. For additional details regarding the all-live range, refer to other portions of the application below.

The method may also include further updating the updated populated PHVEC with the tracked special segments by using the tracked special segments to clear bits of the PHVEC, the further updated populated PHVEC removed the impact of the special segments on the PHVEC. The method may also include performing an action set based on the further updated PHVEC to remediate at least one missing segment from the containers.

The special segments may be tracked based on writes of the special segments to a portion of the containers. The portion of the containers may be outside of a range of the containers on which garbage collection is being performed (e.g., the containers which have been selected for garbage collection and are being processed as part of the garbage collection), and may be limited to segment references that reference segments in the range of the containers on which garbage collection is being performed or are associated with open files for which metadata has not yet been completed.

The deduplicated data storage system, while ingesting the new segments, may not remove substantially in real-time a portion of the segments corresponding to a portion of the files that are deleted from the deduplicated data storage system. The deduplicated data storage system may delete the portion of the files by substantially in real-time removing metadata corresponding to the portion of the segments while retaining the portions of the segments corresponding. Doing so may cause segments corresponding to the files to be subsequently removed during garbage collection. The segments may be deleted by deleting the portion of the containers while updating the populated PHVEC, as part of an integrated process.

The computer-implemented method may also include obtaining the PHVEC using a fingerprint to container map, the fingerprint to container map may specify a number of segments managed by the deduplicated data storage system, and container references for the segments that allow the segments to be read by indexing to corresponding containers and using metadata of the respective container to read the corresponding segments in the containers.

A non-transitory media may include instructions that when executed by a processor cause the computer-implemented method to be performed.

A data processing system may include the non-transitory media and a processor, and may perform the computer-implemented method when the computer instructions are executed by the process.

Turning to FIG. 1, a block diagram illustrating a system according to one embodiment of the invention is shown. The system may include, but is not limited to, one or more clients 100 communicatively coupled to a storage system 110.

Clients 102-104 may be implemented using any type of computing device such as a host or server, a personal computer (e.g., desktops, laptops, and tablets), a "thin" client, a personal digital assistant (PDA), a Web enabled appliance, or a mobile phone (e.g., Smartphone), or any other type of data processing device or system. Any of clients 102-104 may be a portion of a primary storage system (e.g., local data center) that provides data storage and/or access services to other devices (e.g., other types of clients, other computing device installations, etc.).

Clients 102-104 may provide computer implemented services to users thereof and/or other computing devices operably connected to them. The computer implemented services may include any type and quantity of services including, for example, database services, instant messaging services, video conferencing services, etc. When providing the aforementioned services, data that is relevant to the users or other devices may be locally stored in clients 102-104. If this data becomes inaccessible due to, for example, an error in a local storage system of clients 102-104, then clients 102-104 may be unable to provide computer implemented services desired by the users and/or other devices. Likewise, the local storage system of clients 102-104 may have a limited capacity for storing data.

To reduce the likelihood of clients 102-104 being unable to provide desired computer implemented services, clients 102-104 may periodically back up their data (e.g., client data) and/or migrate portions of data to storage system 110. Backing up data may include storing a copy of the data (or other data usable to reconstruct or otherwise obtain a copy of the data in the future) in a second device (e.g., a storage system). Such backed up data may be usable to restore the operation of all, or a portion, of the function of clients 102-104 to a previous state (e.g., a state associated with the backed up data).

The second device in which a copy of the backed up data is stored may be in a separate fault domain from the client device backing up its data. For example, the second device may be in a separate location that is unlikely to be subject to the same conditions (which may lead to data inaccessibility) as the client.

Migrating data to storage system 110 may free local storage resources of clients 100. For example, clients 100 may utilize remote access to the data in storage system 110 to allow clients 100 to use portions of their storage resources for other takes which would otherwise be utilized for storing the data locally rather than remotely.

To utilize storage system 110, clients 100 may send copies of data to storage system 110 and/or request copies of data from storage system 110. In an embodiment, clients 100 may cooperate with storage system 110 to pre-process data, prior to sending it to storage system 110, for deduplication of the data against data already stored in storage system 110 or other purposes. When doing so, clients 100 may only send portions of the data (e.g., that are note duplicative of data already stored in storage system 110) and metadata regarding the data such as identifiers or other information.

Clients 100 may be implemented with any type of computing device such as a host or server, a personal computer (e.g., desktops, laptops, and tablets), a "thin" client, a personal digital assistant (PDA), a Web enabled appliance, or a mobile phone (e.g., Smartphone), etc.

Storage system 110 may provide data storage services. Data storage services may include storing data (e.g., for clients 100 and/or other devices) and providing copies of previous stored data.

In an embodiment, storage system 110 implements one or more methods for computationally efficiently managing data. These techniques may include, for example, (i) data deduplication, (ii) file verification for stored data, and (iii) garbage collection.

In an embodiment, storage system 110 stores data (e.g., from clients 100) using a containerized storage system. A containerized storage system may not include a file system or other types of metadata that allow for real-time data deletion at reasonable computational expense. Rather, storage system 110 may delete data through a garbage collection process that is substantially not in real-time from when storage system 110 becomes aware that files stored in storage system 110 may be deleted. For example, deduplicated stored segments in the containers of the containerized storage system may be deleted significantly later in time from when storage system 110 becomes aware of when the stored segments may be deletable. In an embodiment, the stored segments are deleted through garbage collection, which may only be performed intermittently over time. For additional details regarding storage system 110, refer to FIG. 2.

Storage system 110 may be implemented using any type of computing device such as a host or server, a personal computer (e.g., desktops, laptops, and tablets), a "thin" client, a personal digital assistant (PDA), a Web enabled appliance, or a mobile phone (e.g., Smartphone), etc. Storage system 110 may be implemented as, for example, servers or a cluster of one or more servers (e.g., cloud servers). For example, any of storage system 110 be implemented using a storage server used for various different purposes, such as to provide computing devices with access to shared data and/or to back up (or restore) data (e.g., mission critical data, data that is relevant to users, etc.). Storage system 110 may provide storage services to computing devices via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fiber channel (FC) protocol, etc. Storage system 110 may further provide storage services via an object-based protocol and Hadoop distributed file system (HDFS) protocol.

Network 105 may be any type of networks such as a local area network (LAN), a wide area network (WAN) such as the Internet, a fiber network, a storage network, or a combination thereof, wired or wireless. Clients 100, storage system 110, and other devices (not shown) operably connected through network 105 may be in physical proximity or may be physically remote from one another.

While illustrated in FIG. 1 as included a limited number of specific components, a system in accordance with one or more embodiments may include fewer, additional, and/or different components.

Figure 2:
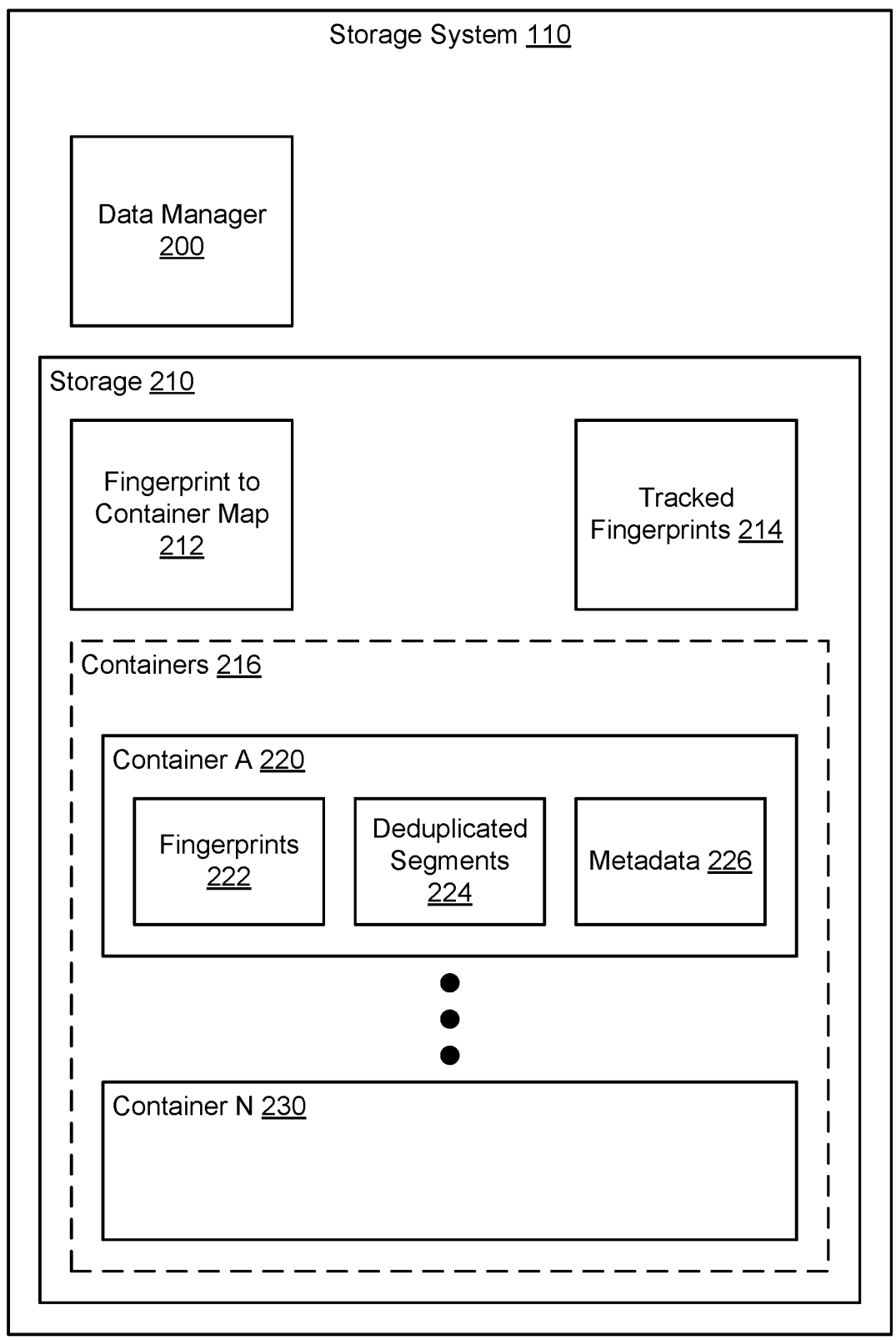
FIG. 2 is a block diagram illustrating a storage system in accordance with an embodiment.

Turning to FIG. 2, a block diagram illustrating storage system 110 according to one embodiment is shown. As discussed above, storage system 110 may manage data by storing data from clients 100 and providing copies of stored data to clients 100. To provide data management services, storage system 110 may include data manager 200 and storage 210. Each of these components is discussed below.

Data manager 200 may provide data management services. To do so, data manager 200 may (i) service data access requests (e.g., storage requests and/or read requests), (ii) deduplicate ingested data (and/or cooperate with clients 100 to deduplicate ingested data), (iii) determine whether data loss has occurred, and (iv) manage the physical storage resources (e.g, storage 210) used to store data.

To provide the data management services, data manager 200 may perform all, or a portion, of the methods illustrated in FIGS. 3A-6.

In an embodiment, data manager 200, when storing data, implements (i) segmentation of data (e.g., dividing to be stored data such as files into segments, which may be bit sequences corresponding to different portions of the files), (ii) deduplication of the segmented data (e.g., by ascertaining whether any of the segments of the segmented data are duplicative of already stored segments) with fingerprints of the data (e.g., hashes of the segments, which may or may not be collision free), (iii) storage of deduplicated segments 224, fingerprints 222 corresponding to the deduplicated segments, and metadata 226 in containers 216, (iv) maintenance of a fingerprint to container map 212 usable to (a) ascertain whether a segment is duplicative of any stored segments using a fingerprint of the segment and (b) identify a container (e.g., 220, 230) of containers 216 in which a segment is stored using the fingerprint of the segment, and (v) maintenance of tracked fingerprints 214 usable to identify segments written to storage 210 that may need to be tracked for file verification purposes (e.g., to determine whether storage system 110 has lost any segments through data corruption or other mechanisms).

In an embodiment, data manager 200 performs an integrated process to delete data and perform file verification. The process may include (i) generating a perfect hash vector (PHVEC) based on segments that the storage system believes are stored in storage 210 using the fingerprint to container map 212, (ii) populating the PHVEC with the containers 216 and contents included therein, (iii) while populating the PHVEC, tracking special segments stored in storage 210 during the PHVEC population that may impact file verification, (iv) performing garbage collection on the containers 216 by copying live data from containers that have too little live data to other containers and deleting the containers that have too little live data, (v) updating the PHVEC with the tracked special segments using the tracked fingerprints 214, (vi) and performing file verification using the PHVEC by analyzing whether the updated PHVEC indicates any segments that are believed to be stored in storage 210 are not actually stored in storage 210. The data manager 200 may also perform an action set based on the file verification. The action set may include, for example, reporting of missing segments, taking corrective action to obtain copies or otherwise obtain the missing segments, etc.

In one embodiment, data manager 200 is implemented using a hardware device including circuitry. The hardware device may be, for example, a digital signal processor, a field programmable gate array, or an application specific integrated circuit. The circuitry may be adapted to cause the hardware device to perform the functionality of data manager 200. Data manager 200 may be implemented using other types of hardware devices without departing from the invention.

In one embodiment, data manager 200 is implemented using a processor adapted to execute computing code stored on a persistent storage that when executed by the processor performs the functionality of data manager 200 discussed throughout this application. The processor may be a hardware processor including circuitry such as, for example, a central processing unit or a microcontroller. The processor may be other types of hardware devices for processing digital information without departing from the invention.

When performing the methods illustrated in FIGS. 3A-6, data manager 200 may store data in storage 210.

In one embodiment, storage 210 is implemented using physical devices that provide data storage services (e.g., storing data and providing copies of previously stored data). The devices that provide data storage services may include hardware devices and/or logical devices. For example, storage 210 may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

For example, storage 210 may include a memory device (e.g., a dual in line memory device) in which data is stored and from which copies of previously stored data are provided. In another example, storage 210 may include a persistent storage device (e.g., a solid-state disk drive) in which data is stored and from which copies of previously stored data is provided. In a still further example, storage 210 may include (i) a memory device (e.g., a dual in line memory device) in which data is stored and from which copies of previously stored data are provided and (ii) a persistent storage device that stores a copy of the data stored in the memory device (e.g., to provide a copy of the data in the event that power loss or other issues with the memory device that may impact its ability to maintain the copy of the data cause the memory device to lose the data).

Storage 210 may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

Storage 210 may store data structures including a fingerprint to container map 212, tracked fingerprints 214, and any number of containers 216. Each of these data structures is discussed below.

Fingerprint to container map 212 may be implemented using at least one data structure that includes information regarding fingerprints of segments believed to be stored in containers 216 and information regarding where the segments are stored (e.g., identifier of a container in which a segment is believed to be stored, an address for a container, etc.).

The fingerprint to container map 212 may allow a fingerprint to be used to identify (i) whether a corresponding segment is duplicative (or likely to be duplicative) of an already stored segment, (ii) a quantity of segments believed to be stored in containers 216, and (iii) containers in which segments corresponding to fingerprints are stored in containers 216.

Figure 6:
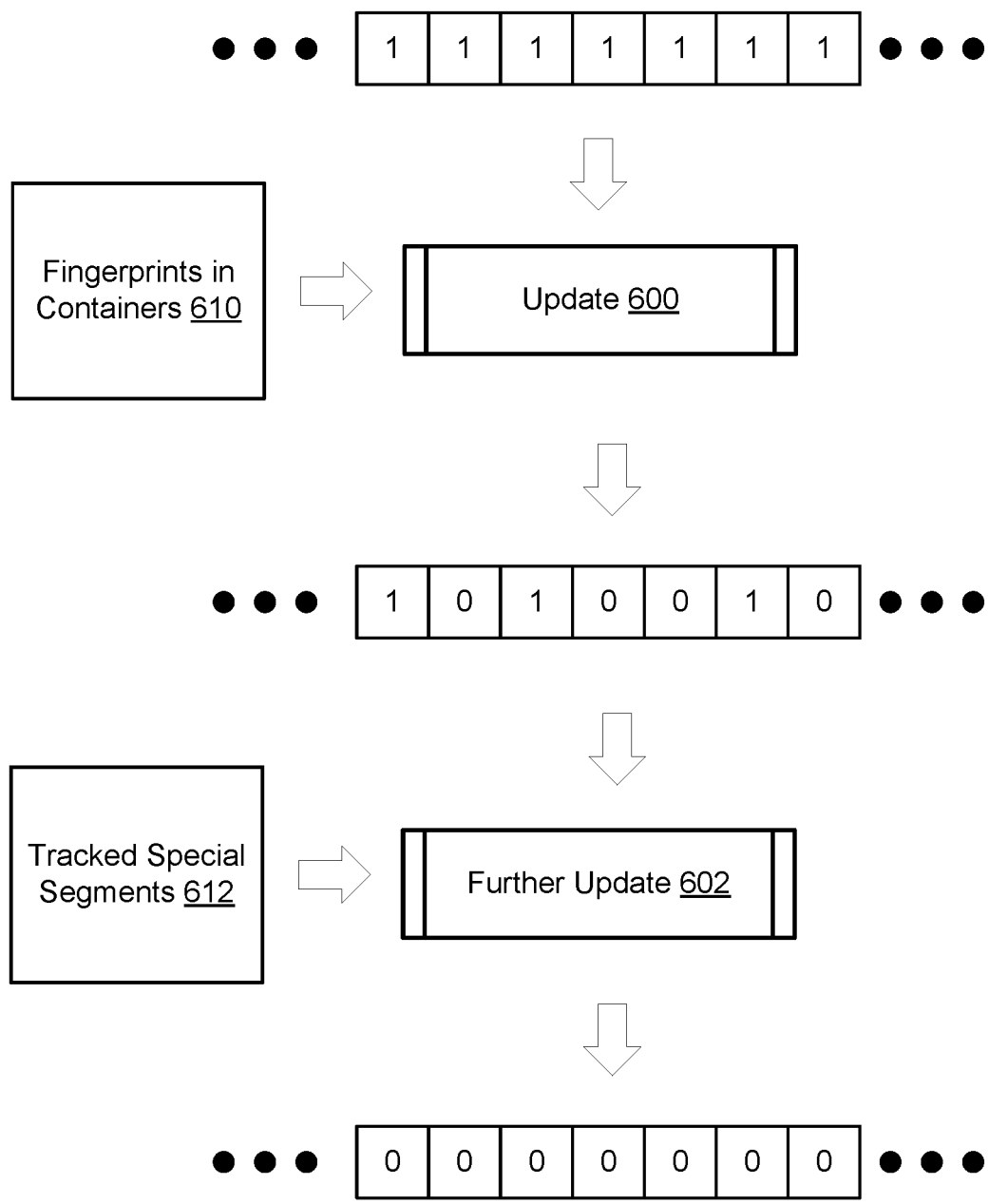
FIG. 6 is a diagram illustrating a perfect hash vector update process in accordance with an embodiment.

Tracked fingerprints 214 may be implemented using at least one data structure that includes information regarding special segments (e.g., fingerprints written to containers in an all-live range) that may impact file verification. As will be discussed later, a PHVEC may be generated and used to ascertain whether segments have been lost from storage 210. However, the PHVEC may not accurately reflect whether segments are lost, until the impact of the special segments is removed. Refer to FIG. 6 for additional details regarding remediating the PHVEC using the tracked fingerprints 214.

In an embodiment, tracked fingerprints 214 includes copies of fingerprints written and that reference segments included in another container range (e.g., a range being subjected to cleaning during garbage collection). Refer to FIG. 3B for additional details regarding container ranges.

In an embodiment, tracked fingerprints 214 includes copies of written to open files during various portions of the integrated file verification/garbage collection.

In an embodiment, tracked fingerprints 214 includes copies of fingerprints for segment metadata written to some of containers 216.

Containers 216 may be implemented using at least one data structure (e.g., 220, 230) for storing fingerprints 222, deduplicated segments 224, and/or metadata 226. Generally, the containers 216 may be a metadata limited arrangement of data to facilitate storing larger amounts (e.g., when compared to file system based storage) of data in limited physical storage resources. For example, the containers 216 may be allocated specific quantities of storage resources, but may not natively include metadata regarding the data stored in each respective container. Similarly, other higher level metadata structures may not be available for the containers 216, thereby allowing for more data to be stored using fewer physical storage resources by storing less metadata (e.g., when compared with other types of data storage that may include large amounts of metadata describing the stored data).

To describe and allow access to the data stored in containers 216, metadata 226 may be stored with each respective containers. Generally, the metadata may allow for the various portions of data in the containers 216 to be read, may allow for files to be synthesized using the deduplicated segments 224, and/or may provide for other features while limiting the total quantity of metadata. Refer to FIG. 8 for additional details regarding arrangement of segments, metadata, and/or other features of data organization and/or description with containers 216.

The data structures stored in storage 210 may be implemented using, for example, lists, tables, unstructured data, trees, databases, etc. While illustrated in FIG. 2 as being stored locally, the data structures may be stored remotely and may be distributed across any number of devices without departing from embodiments of the invention.

While illustrated in FIG. 2 as included a limited number of specific components, storage system 110 may include fewer, additional, and/or different components without departing from embodiments of the invention.

Figure 3A:
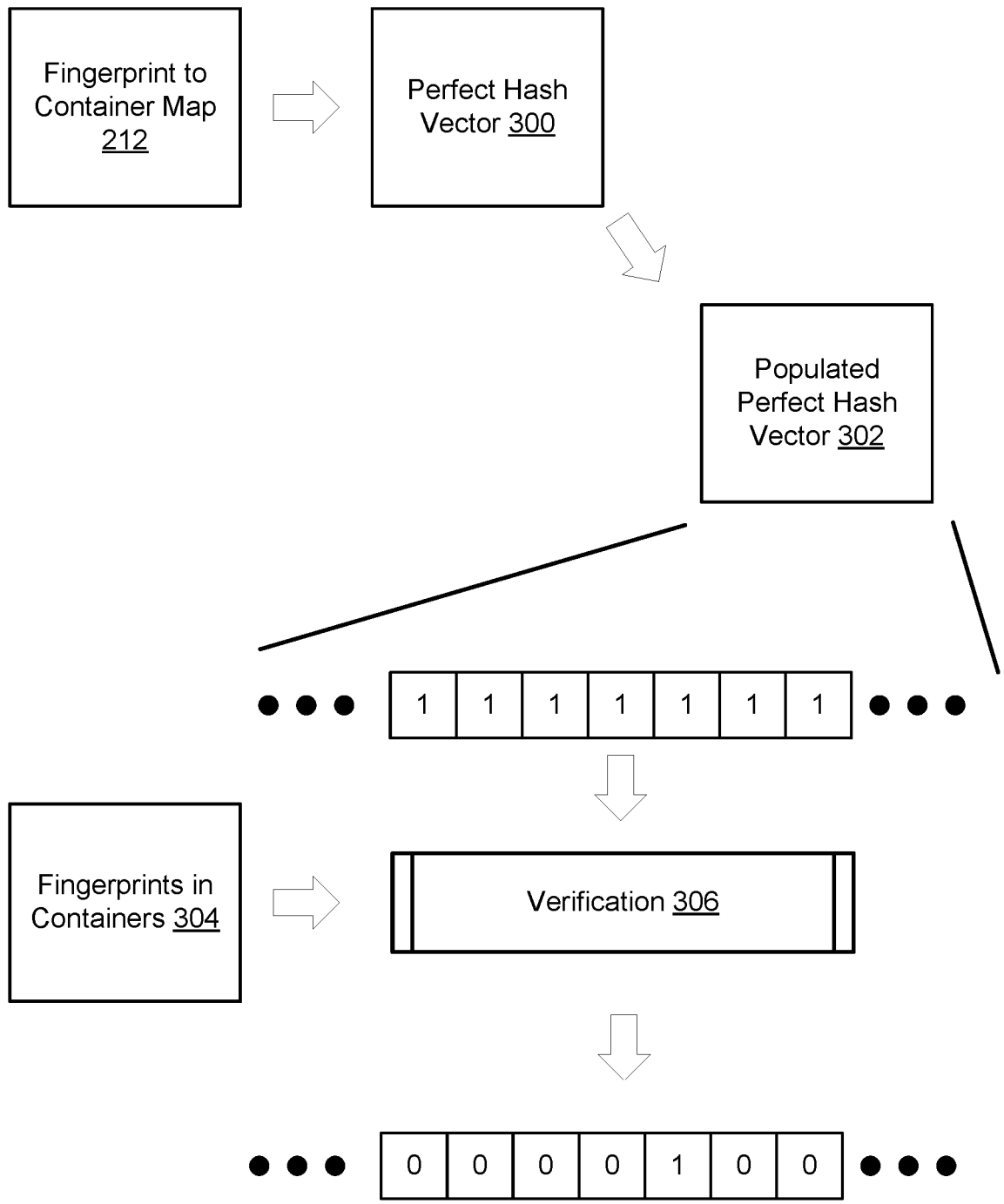
FIG. 3A is a diagram illustrating a verification processes in accordance with an embodiment.
Figure 3B:
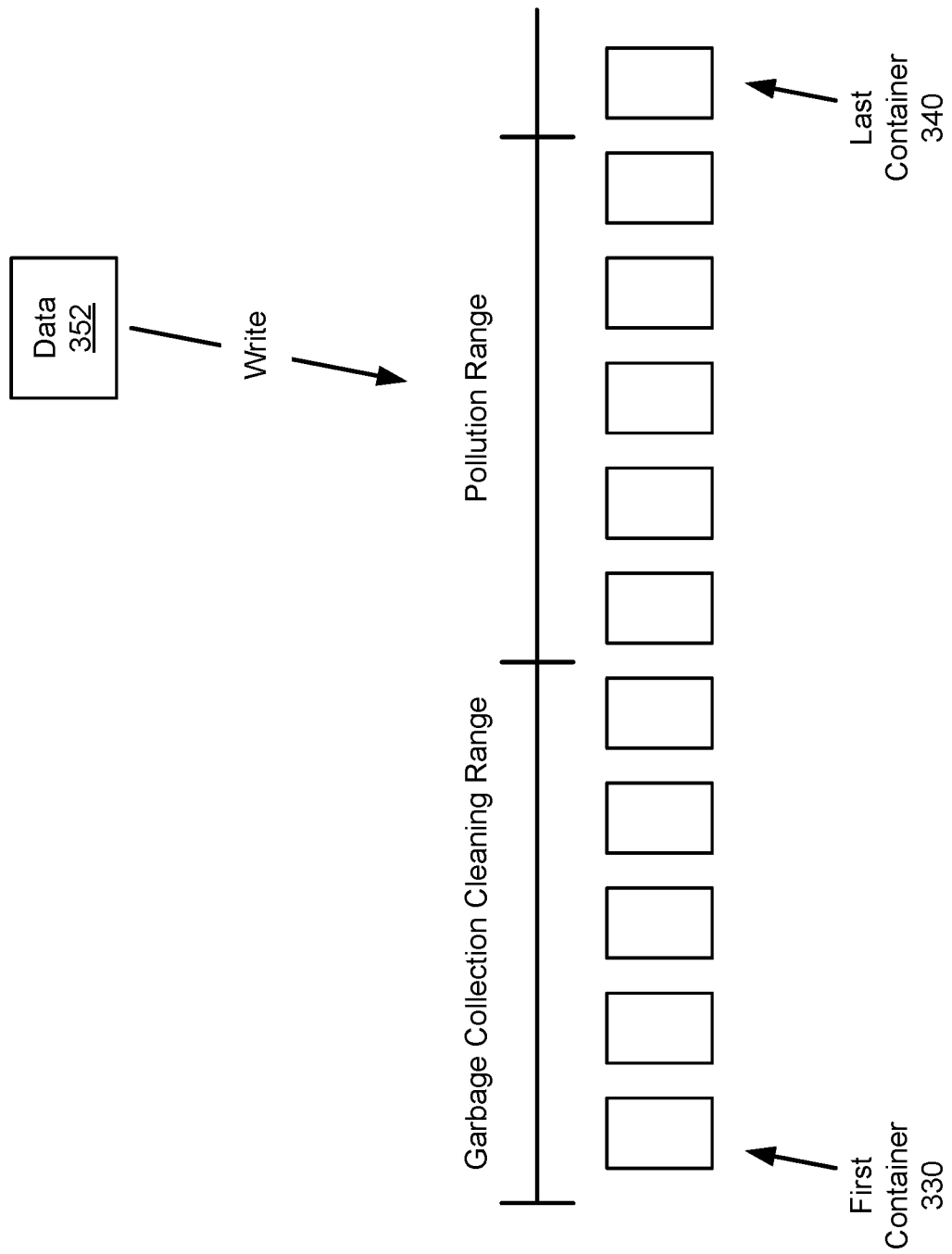
FIG. 3B is a diagram illustrating a perfect hash vector population process in accordance with an embodiment.

Turning to FIG. 3A, a diagram of a file verification process is graphically illustrated. The file verification process may be part of the integrated file verification-garbage collection process implemented by data manager 200.

If a segment is lost from storage, there may be a difference between the fingerprint to container map 212 and the actual segments stored in storage. For example, the fingerprint to container map 212 may indicate that a segment that is not stored in storage is still stored in the storage. Such segments and mismatches may occur due to, for example, data corruption or other reasons.

To perform the process, the fingerprint to container map 212 may be used to generate a perfect hash vector 300 for all of the segments believed to be stored in storage. To do so, the fingerprints of the segments (or information related to the fingerprints) may be used to form the perfect hash vector with a hash function (which may be collision free or may allow for some level of collisions that is unlikely to impact the verification process). The perfect hash vector may be populated for each of the segments believed to be stored thereby obtaining a populated perfect hash vector 302.

The populated perfect hash vector may be a bit sequence of a length corresponding to the number of segments believed to be stored in storage. The value of each of the bits of the perfect hash vector may be set to a predetermined value such as 1 as shown in FIG. 3A. The perfect hash vector may be implemented with a hash function that maps fingerprints of the segments believed to be stored in the storage to bits in the perfect hash vector corresponding to the segments associated with the fingerprints.

After the populated perfect hash vector 302 is obtaining, verification 306 may be performed with the fingerprints in containers 304. For example, the containers may be walked, and the data therein may be walked to identify actually stored segments. The fingerprints of actually stored segments may be used to update the values of the perfect hash vector by clearing the corresponding bit. In this manner, the perfect hash vector may be updated. However, if at least one segment has been lost, then at least one of the bits may not have been cleared upon completion of file verification. In FIG. 3A, the updated perfect hash vector includes a "1" indicating that at least one segment has been lost by virtue of the bit not being cleared.

When performing the verification 306, some of the bits may not be cleared due to special segments in an all-live range. The special segment may impact the manner in which garbage collection is performed by causing some segments to be treated as live regardless of actual status. If the impact of this treatment is not taken into account in the perfect hash vector, then the perfect hash vector may indicate that segments have been lost even when the segments have not been lost. For example, bits in the perfect hash vector that would normally be cleared, but for this special treatment, may not be cleared.

To address the bits that have not been cleared due to special treatment of some segments in a cleaning range, data manager 200 may track writes of special segments to storage. To do so, copies of the special segments may be stored. After verification 306, the perfect hash vector may be further updated using the special segments to remove the impact of special treatment of some segments. For additional details regarding further updating the perfect hash vector 302, refer to FIG. 6.

Turning to FIG. 3B, a diagram of tracking special segments that may impact the perfect hash vector is shown. As discussed above, a storage system may include any number of containers. As the integrated verification-garbage collection process is performed, a perfect hash vector may be initially formed.

After the perfect hash vector is formed, it may be used to select some containers on which to perform cleaning. While cleaning is performed on containers in the garbage collection cleaning range, segments may continue to be ingested by the data storage system.

To perform file verification, as the containers in the cleaning range are processed for cleaning, bits in the perfect hash vector may be cleared as data is copied forward into new containers. However, while the perfect hash vector is being built, special segments written, to containers outside of the garbage collection cleaning range for which the perfect hash vector is built, that reference segments in containers in the garbage collection cleaning range for which the perfect hash vector is built may be ingested. Such segment references written during perfect hash function construction may be described as being written to an all-live range or a pollution range because, to honor the newly ingested references, the segment references may be treated as live. This may result in some bits in the perfect hash vector not being cleared during file verification, and the tracked special segments may be used to clear these bits.

Once the perfect hash vector is populated, the perfect hash vector may be utilized to ascertain whether any of the containers should be deleted (e.g., containers having quantities of live segments falling below a threshold). Once ascertained, the live segments in each of the ascertained containers may be copied to another container, the populated perfect hash vector may be updated (e.g., bits cleared) based on the copied segments (and segment from containers not selected for garbage collection), the ascertained containers may be deleted after the copying, and then the updated populated perfect hash vector may be further updated based on the tracked special segments to remove the impact of the special treatment of some segments during cleaning.

Figure 4:
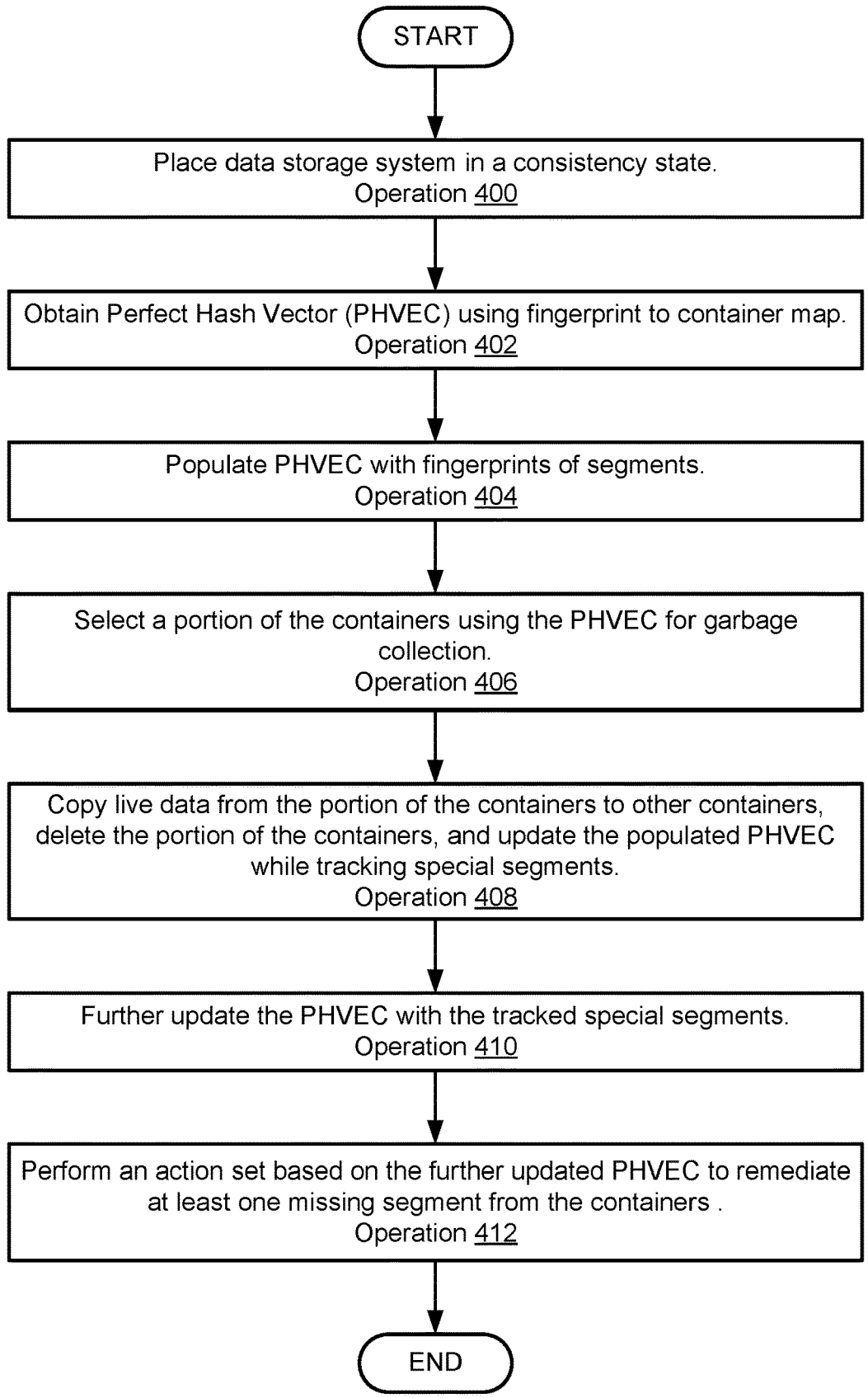
FIG. 4 is a flow diagram illustrating a method of performing an integrated file verification and garbage collection process in accordance with an embodiment.

Turning to FIG. 4, a flow diagram of a method that may be performed by components of the system of FIG. 1 is shown. In the following diagram, any of the operations may be repeated, performed in different orders, and/or performed in parallel with or a partially overlapping in time manner with other operations.

FIG. 4 is a flow diagram illustrating a method of managing data according to an embodiment.

At operation 400, storage of a data storage system is placed in a consistency state. The data storage system may be placed in the consistency state by, for example, flushing buffers, flushing in-memory data structure, or otherwise placing the storage in a state where there is some consistency between stored data and metadata. In an embodiment, the consistency state is achieved by selecting a container range, performing flushing for the container range, and then marking the container range as being in the consistency state.

The perfect hash vector may be obtained using the containers in the range marked as being in the consistency state. As discussed above, the storage system may presume that all segments referenced by a fingerprint to container map are available for retrieval from storage. Thus, the fingerprint to container map may be used to generate the perfect hash vector, which in turn may be used to complete both garbage collection and file verification.

At operation 402, a perfect hash vector is obtained using a fingerprint to container map. For example, the perfect hash vector may be obtained by generating a hash function usable to map each fingerprint specified by the fingerprint to container map to a bit in the perfect hash vector.

At operation 404, the perfect hash vector is populated with fingerprints of segments from the containers.

At operation 406, a portion of the containers are selected for garbage collection using the populated perfect hash vector. The portion of the containers may be selected by determining a number of segments in a container, determining a second number of segments that the perfect hash vector indicates to be live the container, and comparing the number of segments that the perfect hash vector indicates to be live to a threshold. For example, the threshold may specify a percentage or other statistical measure for the container that indicates whether a container should be selected for garbage collection. The threshold may be, for example, a ratio of live to total number of segments stored in a container that if not exceeded indicate that the container should be selected for deduplication.

At operation 408, the live data from the portion of the containers is copied to other containers and the portion of the containers is deleted while the populated PHVEC is used to perform physical file verification. While the perfect hash vector is being constructed, special segments written to containers outside of the portion of the containers are tracked. The special segments may be references to segments in the portion of the containers.

When a cleaning process is performed by copying live segments forward from the portion of the containers to other containers and bits of the PHVEC are cleared based on the copying for file verification purposes, the resulting PHVEC may indicate segment loss even when segment loss has not occurred. For additional details regarding this process, refer to FIGS. 5-6.

Figure 5:
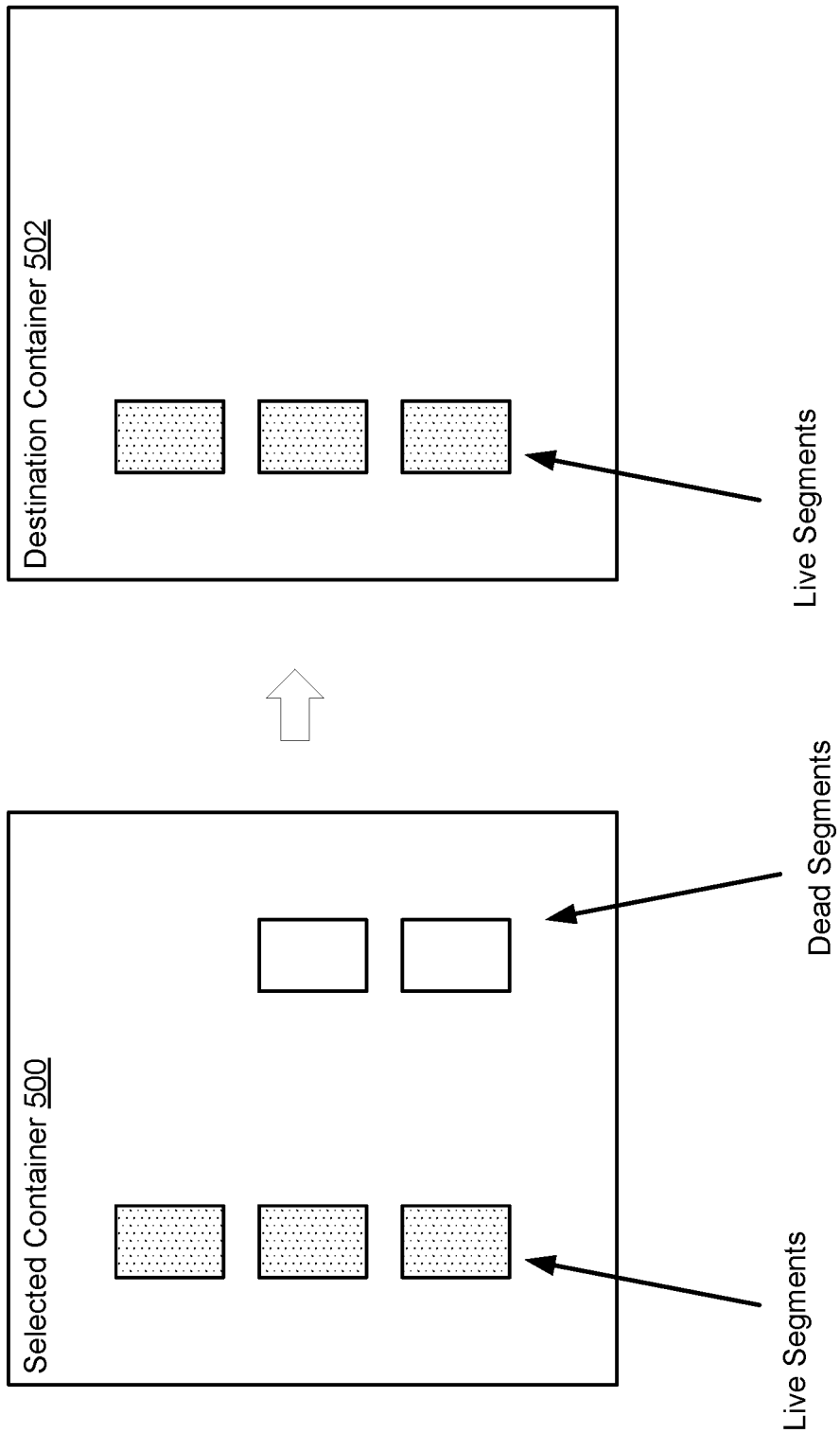
FIG. 5 is a diagram illustrating a garbage collection process in accordance with an embodiment.

Turning to FIG. 5, a diagram showing a data copy from a selected container 500 to a destination container 502 in accordance with an embodiment is shown. As seen in FIG. 5, the selected container 500 may include live segments and dead segments. When the copy is performed, only the live segments are copied to the destination container 502. Accordingly, deleting the selected container 500 frees storage resources by virtue of the dead segments not being copied.

Returning to the discussion of FIG. 4, at operation 410, the perfect hash vector is further updated with the tracked special segments. The perfect hash vector may be updated by, for example, using the tracked special segments to clear bits in the perfect hash vector. By doing so, the impact of the special segments may be removed from the perfect hash vector.

To further update the perfect hash vector, the special segments may be used to clear bits using the special segments in the perfect hash vector. For example, the fingerprint of each special segment may be used to identify a corresponding bit in the perfect hash vector, which may be cleared to further update the perfect hash vector. For additional details regarding this process, refer to FIG. 6.

Turning to FIG. 6, a diagram illustrating a process of updating and further updating a populated perfect hash vector in accordance with an embodiment is shown. To update the populated perfect hash vector, the fingerprints in containers 610 may be used to perform update 600. In update 600, the fingerprints in the containers (e.g., as they are copied as illustrated in FIG. 5 and after containers not selected for deletion are identified) are used to clear the bits of the populated perfect hash vector. However, due to some segments being treated as live regardless of their status, some of the bits in the perfect hash vector may not be cleared even though segment loss has not occurred.

After update 600, further update 602 may be performed with the tracked special segments 612. The tracked special segments 612 may be used to clear bits in the updated perfect hash vector. To do so, the fingerprints of the tracked special segments 612 may be used to identify (e.g., operated on by the hash function) the bits in the bit sequence corresponding to the tracked special sequence and clear them.

After further update 602, the values of the bits in the perfect hash vector may indicate whether corresponding data segments have been lost. Thus, if all of the bit values in the perfect hash vector have been cleared, then the perfect hash vector may indicate that no segments have been lost (e.g., as illustrated in FIG. 6). In contrast, if any the bits of the further updated perfect hash vector have not been cleared (e.g., the first sequence of all "1" illustrated at the top of FIG. 6), then it may be determined that segments corresponding to these bits may be lost (e.g., unable to be retrieved from storage due to, for example, operation error, data corruption, etc.).

Returning to the discussion of FIG. 4, at operation 412, an action set based on the further updated perfect hash vector is performed to remediate at least one missing segment from the containers indicated to be present by the further updated perfect hash vector. The action set may include, for example, (i) providing a list of missing segments to another entity and/or notifying an administrator, (ii) initiating a data recovery protocol to obtain copies of the at least one missing segment, (iii) initiating a self diagnostic routine, (iv) suspending new data access activities such as storing data and/or providing copies of stored data and/or (v) performing other actions that may be used to recover the lost segments and/or prevent loss of other segments.

Figure 7:
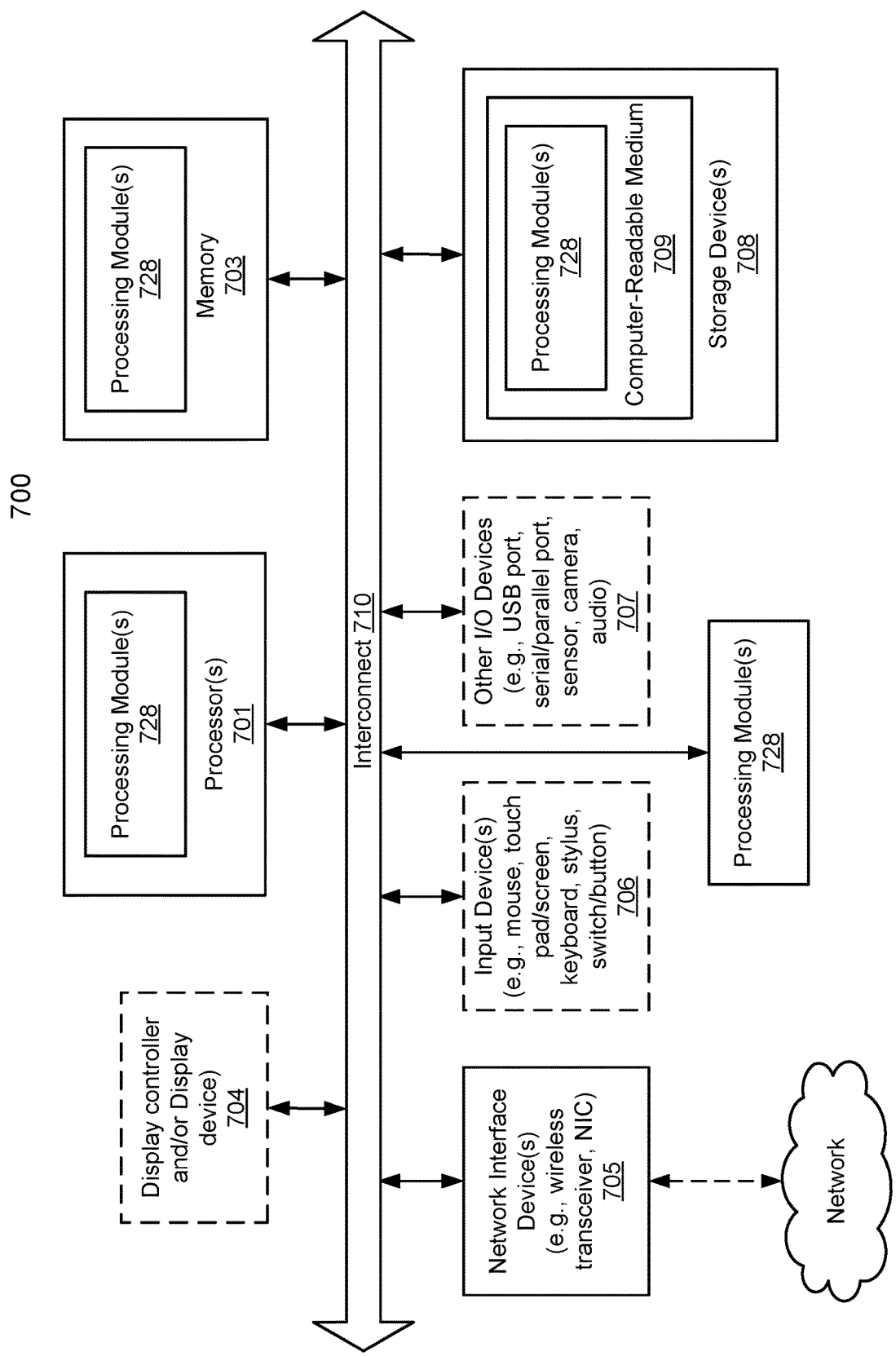
FIG. 7 is a block diagram illustrating a data processing system in accordance with an embodiment.

Any of the components illustrated in FIGS. 1-6 may be implemented with one or more computing devices. Turning to FIG. 7, a block diagram illustrating an example of a data processing system (e.g., a computing device) in accordance with an embodiment is shown. For example, system 700 may represent any of data processing systems described above performing any of the processes or methods described above. System 700 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 700 is intended to show a high level view of many components of the computer system. However, it is to be understood that additional components may be present in certain implementations and furthermore, different arrangement of the components shown may occur in other implementations. System 700 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 700 includes processor 701, memory 703, and devices 705-708 via a bus or an interconnect 710. Processor 701 may represent a single processor or multiple processors with a single processor core or multiple processor cores included therein. Processor 701 may represent one or more general-purpose processors such as a microprocessor, a central processing unit (CPU), or the like. More particularly, processor 701 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 701 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 701, which may be a low power multi-core processor socket such as an ultra-low voltage processor, may act as a main processing unit and central hub for communication with the various components of the system. Such processor can be implemented as a system on chip (SoC). Processor 701 is configured to execute instructions for performing the operations discussed herein. System 700 may further include a graphics interface that communicates with optional graphics subsystem 704, which may include a display controller, a graphics processor, and/or a display device.

Processor 701 may communicate with memory 703, which in one embodiment can be implemented via multiple memory devices to provide for a given amount of system memory. Memory 703 may include one or more volatile storage (or memory) devices such as random access memory (RAM), dynamic RAM (DRAM), synchronous DRAM (SDRAM), static RAM (SRAM), or other types of storage devices. Memory 703 may store information including sequences of instructions that are executed by processor 701, or any other device. For example, executable code and/or data of a variety of operating systems, device drivers, firmware (e.g., input output basic system or BIOS), and/or applications can be loaded in memory 703 and executed by processor 701. An operating system can be any kind of operating systems, such as, for example, Windows® operating system from Microsoft®, Mac OS®/iOS® from Apple, Android® from Google Linux Unix®, or other real-time or embedded operating systems such as VxWorks.

System 700 may further include IO devices such as devices (e.g., 705, 706, 707, 708) including network interface device(s) 705, optional input device(s) 706, and other optional IO device(s) 707. Network interface device(s) 705 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 706 may include a mouse, a touch pad, a touch sensitive screen (which may be integrated with a display device of optional graphics subsystem 704), a pointer device such as a stylus, and/or a keyboard (e.g., physical keyboard or a virtual keyboard displayed as part of a touch sensitive screen). For example, input device(s) 706 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 707 may include an audio device. An audio device may include a speaker and/or a microphone to facilitate voice-enabled functions, such as voice recognition, voice replication, digital recording, and/or telephony functions. Other IO devices 707 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 707 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 710 via a sensor hub (not shown), while other devices such as a keyboard or thermal sensor may be controlled by an embedded controller (not shown), dependent upon the specific configuration or design of system 700.

To provide for persistent storage of information such as data, applications, one or more operating systems and so forth, a mass storage (not shown) may also couple to processor 701. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 701, e.g., via a serial peripheral interface (SPI). This flash device may provide for non-volatile storage of system software, including a basic input/output software (BIOS) as well as other firmware of the system.

Storage device 708 may include computer-readable storage medium 709 (also known as a machine-readable storage medium or a computer-readable medium) on which is stored one or more sets of instructions or software (e.g., processing module, unit, and/or processing module/unit/logic 728) embodying any one or more of the methodologies or functions described herein. Processing module/unit/logic 728 may represent any of the components described above, such as, for example, data manager 200 as described above. Processing module/unit/logic 728 may also reside, completely or at least partially, within memory 703 and/or within processor 701 during execution thereof by system 700, memory 703 and processor 701 also constituting machine-accessible storage media. Processing module/unit/logic 728 may further be transmitted or received over a network via network interface device(s) 705.

Computer-readable storage medium 709 may also be used to store some software functionalities described above persistently. While computer-readable storage medium 709 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 728, components and other features described herein can be implemented as discrete hardware components or integrated in the functionality of hardware components such as ASICS, FPGAs, DSPs or similar devices. In addition, processing module/unit/logic 728 can be implemented as firmware or functional circuitry within hardware devices. Further, processing module/unit/logic 728 can be implemented in any combination hardware devices and software components.

Note that while system 700 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

Turning to FIG. 8, a diagram of a data structure in accordance with an embodiment is shown. As discussed above, data may be stored in a containerized storage structure which may not include common examples of metadata used in other storage systems such as file systems. To facilitate utilization of stored data, the data structure illustrated in FIG. 8 may be utilized. The data may be, for example, a segment tree 802.

The segment tree may include a reference 800 reflecting the information stored in the data structure. The reference 800 may point to a top level node (e.g., an L6 node) of a tree structure. Successive nodes lower in the tree structure may branch as indicated by the arrows. The successive, intermediate nodes may include metadata and may be referred to as metadata segments 806. At the bottom of the tree, any number of nodes (e.g., L0 nodes or leaf nodes) may include data segments 804.

The aforementioned tree structure may allow for the data stored in containers to be walked by starting at the top level node and using the pointers to successive nodes for tree traversal purposes. By walking the segment tree 802, segment presence may be identified. If a segment is lost, it may not be walked to with the segment tree 802. For example, if an intermediate node's pointer to a L0 node is corrupted, the corresponding data segment may not be readable. Similarly, if the data of a leaf node is corrupted, it may be rendered unreadable and lost. Thus, there may be multiple mechanisms through which segments may be lost.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
populating a perfect hash vector (PHVEC) with fingerprints of deduplicated segments of files stored in a deduplicated data storage system that stores the deduplicated segments of the files in containers by performing physical file verification and garbage collection while new segments of the files are ingested by the deduplicated data storage system;
selecting a portion of the containers using the PHVEC for garbage collection and tracking special segments written to an all-live range of the containers while the PHVEC is constructed;
copying live data from the portion of the containers to other containers and deleting the portion of the containers while using the PHVEC to perform physical file verification for the segments;
using the tracked special segments to complete the physical file verification; and
performing an action set based on the completed physical file verification to remediate at least one missing segment.

2. The computer-implemented method of claim 1, wherein the special segments comprise segment references that reference segments stored in the portion of the containers.

3. The computer-implemented method of claim 2, wherein the segment references are outside of a range of the PHVEC.

4. The computer-implemented method of claim 2, wherein the special segments further comprise segment references corresponding to an open file.

5. The computer-implemented method of claim 1, wherein the deduplicated data storage system, while ingesting the new segments, does not remove substantially in real-time a portion of the segments corresponding to a portion of the files that are deleted from the deduplicated data storage system.

6. The computer-implemented method of claim 5, wherein the deduplicated data storage system deletes the portion of the files by substantially in real-time removing metadata corresponding to the portion of the segments while retaining the portions of the segments corresponding to the portion of the files until garbage collection on containers storing the portion of the segments is performed.

7. The computer-implemented method of claim 6, wherein the segments are deleted by deleting the portion of the containers while updating the populated PHVEC.

8. The computer-implemented method of claim 1, further comprising:
obtaining the PHVEC using a fingerprint to container map, the fingerprint to container map specifying:
a number of live segments managed by the deduplicated data storage system, and
container references for the live segments that allow the live segments to be read by indexing to corresponding containers and using metadata of the respective container to read corresponding live segments in the containers.

9. The computer-implemented method of claim 1, wherein the populated PHVEC comprises a bit sequence of a length corresponding to a number of segments believed to be live in the deduplicated data storage system.

10. The computer-implemented method of claim 9, wherein each bit of the bit sequence corresponds to one of the number of segments.

11. The computer-implemented method of claim 9, wherein using the PHVEC to perform physical file verification for the segments comprises clearing the bits as segments in the selected portion of the containers treated as live are copied from the selected portion of the containers.

12. A non-transitory machine-readable medium having instructions stored therein, which when executed by a processor, cause the processor to perform operations, the operations comprising:
populating a perfect hash vector (PHVEC) with fingerprints of deduplicated segments of files stored in a deduplicated data storage system that stores the deduplicated segments of the files in containers by performing physical file verification and garbage collection while new segments of the files are ingested by the deduplicated data storage system;
selecting a portion of the containers using the PHVEC for garbage collection and tracking special segments written to an all-live range of the containers while the PHVEC is constructed;
copying live data from the portion of the containers to other containers and deleting the portion of the containers while using the PHVEC to perform physical file verification for the segments;
using the tracked special segments to complete the physical file verification; and
performing an action set based on the completed physical file verification to remediate at least one missing segment.

13. The non-transitory machine-readable medium of claim 12, wherein the special segments comprise segment references that reference segments stored in the portion of the containers.

14. The non-transitory machine-readable medium of claim 13, wherein the segment references are outside of a range of the PHVEC.

15. The non-transitory machine-readable medium of claim 13, wherein the special segments further comprise segment references corresponding to an open file.

16. The non-transitory machine-readable medium of claim 12, wherein the deduplicated data storage system, while ingesting the new segments, does not remove substantially in real-time a portion of the segments corresponding to a portion of the files that are deleted from the deduplicated data storage system.

17. A deduplicated data storage system, comprising:
a processor; and
a memory coupled to the processor to store instructions, which when executed by the processor, cause the processor to perform operations, the operations comprising:
populating a perfect hash vector (PHVEC) with fingerprints of deduplicated segments of files stored in the deduplicated data storage system that stores the deduplicated segments of the files in containers by performing physical file verification and garbage collection while new segments of the files are ingested by the deduplicated data storage system;
selecting a portion of the containers using the PHVEC for garbage collection and tracking special segments written to an all-live range of the containers while the PHVEC is constructed;
copying live data from the portion of the containers to other containers and deleting the portion of the containers while using the PHVEC to perform physical file verification for the segments;
using the tracked special segments to complete the physical file verification; and
performing an action set based on the completed physical file verification to remediate at least one missing segment.

18. The deduplicated data storage system of claim 17, wherein the special segments comprise segment references that reference segments stored in the portion of the containers.

19. The deduplicated data storage system of claim 18, wherein the segment references are outside of a range of the PHVEC.

20. The deduplicated data storage system of claim 18, wherein the special segments further comprise segment references corresponding to an open file.

* * * * *